(12) United States Patent
Yanagi et al.

(10) Patent No.: US 6,569,396 B1
(45) Date of Patent: May 27, 2003

(54) METHOD FOR PRODUCING CALCIUM PHOSPHATE POWDER

(75) Inventors: Shouhan Yanagi, Yokohama (JP); Mamoru Senna, Chofu (JP); Tetsuhiko Isobe, Yokohama (JP); Manabu Kanayama, Kamakura (JP)

(73) Assignee: Nara Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/701,193
(22) PCT Filed: Mar. 26, 1999
(86) PCT No.: PCT/JP99/01545

§ 371 (c)(1),
(2), (4) Date: Nov. 27, 2000

(87) PCT Pub. No.: WO00/58210

PCT Pub. Date: Oct. 5, 2000

(51) Int. Cl.$^7$ ................................................. C01B 25/32
(52) U.S. Cl. ........................ 423/308; 423/309; 423/311
(58) Field of Search ................................ 423/308, 309, 423/311

(56) References Cited

U.S. PATENT DOCUMENTS

| | | | |
|---|---|---|---|
| 4,717,556 A | * 1/1988 | Kawamura et al. | 423/308 |
| 5,053,212 A | * 10/1991 | Constantz et al. | 423/309 |
| 5,322,675 A | * 6/1994 | Hakamatsuka et al. | 423/308 |
| 5,683,496 A | * 11/1997 | Ison et al. | 423/308 |
| 6,002,065 A | * 12/1999 | Constantz et al. | 423/308 |
| 6,228,339 B1 | * 5/2001 | Ota et al. | 423/308 |

OTHER PUBLICATIONS

Preprint of the 36$^{th}$ Symposium on Powder Science and Technology, by Mamoru Senna, Tetsuhiko Isobe and Manabu Kanayama, on Oct. 7, 1998 in Japan.

* cited by examiner

*Primary Examiner*—Wayne A. Langel
(74) *Attorney, Agent, or Firm*—Oblon, Spivak, McClelland, Maier & Neustadt, P.C.

(57) ABSTRACT

The present invention provides a method of manufacturing calcium phosphate powder comprising the steps of preparing a mixed material by mixing calcium hydroxide ($Ca(OH)_2$) powder and calcium hydrogenphosphate powder so that a molar ratio (Ca/P) of calcium to phosphor is set to a range of 1.45–1.72; conducting a mixing/milling treatment to the mixed material to cause a soft-mechanochemical compositing reaction thereby to prepare a calcium phosphate precursor; and conducting a heat treatment to thus obtained precursor at a temperature of 600° C. or more thereby to prepare calcium phosphate powder. According to the present invention, the manufacturing process is simple and the manufacturing cost can be remarkably reduced. In addition, fine calcium phosphate powder excellent in characteristics can be easily manufactured in a short time.

7 Claims, 13 Drawing Sheets

METHOD FOR PRODUCING CALCIUM PHOSPHATE POWDER

TECHNICAL FIELD

The present invention relates to a method of manufacturing calcium phosphate powders such as β-tricalcium phosphate and hydroxy calcium phosphate or the like that are suitable for biomaterials, and more particularly relates to a method of manufacturing the calcium phosphate powders that are capable of easily manufacturing the calcium phosphate powders having an excellent characteristics through a simple manufacturing process, and capable of greatly reducing a manufacturing cost of the calcium phosphates.

BACKGROUND ART

Calcium phosphates typically represented by β-tricalcium phosphate [$Ca_3(PO_4)_2$] and hydroxy calcium phosphate (hydroxy apatite) [$Ca_{10}(PO_4)_6(OH)_2$] are excellent in suitability to organism structure and have an affinity to organism body, so that calcium phosphates are valuable as bio-ceramic raw materials for constituting artificial bone, artificial tooth, artificial articulate or the like. In addition, calcium phosphates have been widely utilized as materials such as base material for tooth paste, additive for medical product, food additives, material for cosmetic chemist, separating/absorbing material for biopolymer and material for constituting humidity sensor or the like.

Conventionally, these calcium phosphate powders have been manufactured in accordance with the following methods such as wet-way (liquid phase) synthesizing method, dry-way (solid phase) synthesizing method, mechanochemical-reaction synthesizing method or the like. The wet-type synthesizing method is a synthesizing methodin which a calcium solution of calcium nitrate or the like is reacted with a phosphoric acid solution of ammonium hydrogen phosphate, or an amorphous calcium phosphate is produced from a reaction being taken place in heterogeneous system comprising calcium hydroxide and phosphoric acid, then the formed amorphous calcium phosphate is subjected to a calcining treatment thereby to produce β-tricalcium phosphate (β-TCP).

On the other hand, the dry-type synthesizing method is a method in which calcium carbonate is reacted with calcium pyrophosphate in a solid phase at a high temperature thereby to obtain calcium phosphate powder.

On the other hand, in these years, there has been also proposed a manufacturing method comprising simple manufacturing process and utilizing the mechanochemical reaction as a new method of synthesizing the calcium phosphate compound. For example, a publication of examined Japanese Patent Application No. HEI3-69844 and a publication of unexamined Japanese Patent Application No. HEI4-321508 disclose a method in which calcium carbonate powder and calcium hydrogenphosphate powder or dihydrate thereof are mixed to prepare a slurry of which molar ratio (Ca/P) of calcium to phosphor is controlled, then thus obtained slurry is milled by using a ball mill or a vibration mill or the like to cause reaction, thereafter, the reaction product is dried and heat-treated at a high temperature thereby to manufacture crystallized β-tricalcium phosphate (β-TCP).

Further, a publication of unexamined Japanese Patent Application No. HEI4-321508 discloses a method in which β-tricalcium phosphate is heated under a condition of existing water and pressingly treated thereby to manufacture hydroxy calcium phosphate (hydroxy apatite) powder. In this connection, in the conventional process of manufacturing the hydroxy calcium phosphate, a process directly using the mechanochemical reaction has not been adopted.

However, in case of the conventional wet-type synthesizing method, the synthesizing conditions such as the molar ratio of a raw material, treating speed, pH or the like are required to be strictly controlled. On the other hand, there is a difficulty in obtaining a product having a compositional high purity and uniformity. At any rate, for the purpose of obtaining a powder having a compositional high-purity and uniformity, there is posed a problem that the manufacturing cost would be greatly increased.

In contrast, in case of the conventional dry-type synthesizing method, the synthesized calcium phosphate powder has a coarse grain size, so that the powder cannot be directly used as a bio-ceramics raw material and a fine grinding or milling treatment is essentially required whereby there is posed a problem that the manufacturing process becomes complicate and troublesome.

On the other hand, in case of the conventional synthesizing method utilizing the mechanochemical react ion, a long-term grinding process for 1 day to 50 hours is essentially required for advancing the reaction, thereby to cause a problem that the production cost is greatly increased. In addition, in order to smoothly advance the reaction, a solid content of the slurry is required to be set to a lower level. Therefore, there are posed various problems such that an amount of heat energy to be put into the subsequent drying process remarkably increases, a drying operation is required to perform for a long time. In addition, for the purpose of pulverizing or grinding the coarsely aggregated bodies caused by the drying operation, an additional grinding process is essentially required, so that there is posed a fatal problem such that a running cost for the manufacturing facilities and the production cost are greatly increased.

The present invention had been achieved to solve the aforementioned problems and an object of the present invention is to provide a method of manufacturing calcium phosphate powder, the method being capable of easily manufacturing fine calcium phosphate powder having excellent characteristics by a simple manufacturing process and capable of greatly reducing the production cost of the powder.

DISCLOSURE OF THE INVENTION

In order to achieve the aforementioned object, the inventors of the present invention had prepared calcium phosphate powders under various conditions by using various material powders, reacting synthesizing methods and pulverizing devices (grinding machines). Then, through many experiments, the inventors had comparatively reviewed the influences of the differences in the manufacturing conditions onto characteristics and manufacturing cost of calcium phosphate powder as a product.

As a result, the inventors had found and obtained the following knowledge. That is, when calcium hydroxide powder as a raw material is used in place of the conventional calcium carbonate, then the calcium hydroxide powder is mixed to calcium hydrogen phosphate powder thereby to prepare a mixed material, then the mixed material is further mixed and milled to take place a mechanochemical reaction. Thereafter, when the reaction product is heat-treated, there can be obtained knowledge that fine particles of calcium phosphate compound having a high crystallinity and high homogeneity can be effectively manufactured in a short time.

In particular, when a multi-ring media type ultrafine mill comprising a number of ring-shaped milling media is used as a mixing and milling device for advancing a mechanochemical reaction by conducting the mixing and the milling of the mixed material, there could be also obtained the findings such that a reaction activity of the mixed material was increased, and it became possible to rapidly advance the above mechanochemical reaction whereby a production efficiency of the calcium phosphate compound could be remarkably increased.

Furthermore, in the conventional various synthesizing methods conducted in a wet, the solid component content (viscosity) of the mixed material slurry required to be suppressed to a lower level, and the mixed material slurry is required to be mixed and pulverized for a long time. In contrast, when the above ultrafine mill is used, even if the slurry has a high solid content and a high viscosity, there could be also obtained a finding that it becomes possible to mix and pulverize the slurry in a short time whereby the production efficiency of the calcium phosphate compound could be remarkably increased.

The present invention had been achieved on the basis of the above findings. Namely, a method of manufacturing calcium phosphate powder according to the present invention comprises the steps of preparing a mixed material by mixing calcium hydroxide ($Ca(OH)_2$) powder and calcium hydrogenphosphate powder so that a molar ratio (Ca/P) of calcium to phosphor is set to a range of 1.45–1.72; conducting a mixing/milling treatment to the mixed material to cause a soft-mechanochemical compositing reaction thereby to prepare a calcium phosphate precursor; conducting a heat treatment to thus obtained precursor at a temperature of 600° C. or more thereby to prepare a calcium phosphate powder.

In the above method, it is preferable that the calcium hydrogenphosphate is at least one compound selected from the group consisting of calcium monohydrogenphosphate ($CaHPO_4$), calcium monohydrogenphosphate dihydrate ($CaHPO_4 \cdot 2H_2O$), calcium dihydrogenphosphate ($Ca(H_2PO_4)_2$); and calcium dihydrogenphosphate monohydrate ($Ca(H PO_4)_2 \cdot H_2O$).

Further, it is preferable that the calcium phosphate to be prepared after the heat treatment is at least one of β-tricalcium phosphate (TCP) and calcium hydroxyphosphate (hydroxyapatite: HAp). Furthermore, it is also preferable that the molar ratio (Ca/P) of calcium to phosphor contained in the mixed material is set to a range of 1.45–1.55, the calcium phosphate precursor to be formed by the soft-mechanochemical compositing reaction is tricalcium phosphate precursor, and the calcium phosphate to be prepared after the heat treatment is β-tricalcium phosphate.

In addition, it is also preferable that the molar ratio (Ca/P) of calcium to phosphor contained in the mixed material is set to a range of 1.62–1.72, the calcium phosphate precursor to be formed by the soft-mechanochemical compositing reaction is hydroxyapatite (HAp), and the calcium phosphate to be prepared after the heat treatment is calcium hydroxyphosphate.

Further, the mixing/milling treatment for the mixed material may be performed by a dry-process. Furthermore, the mixed material may be prepared in a form of slurry and the mixing/milling treatment for the slurry may be performed by a wet-process. In addition, it is preferable that a content (concentration) of solid component contained in the slurry is set to 15–50 wt %. In particular, it is preferable that the mixing/milling treatment for the mixed material is performed by means of a multi-ring type ultrafine mill comprising a number of ring-shaped pulverizing media.

The present invention adopts a countermeasure in which calcium hydroxide ($Ca(OH)_2$) powder is used as a material in place of calcium carbonate that has been conventionally used as the material, and calcium hydroxide and calcium hydrogenphosphate are mixed and milled so that an inter reaction i.e. soft-mechanochemical reaction between acid-base points at surface of material particles is taken place whereby the calcium phosphate powders such as β-tricalcium phosphate or the like is synthesized in a short time.

More concretely to say, the manufacturing method comprises the steps of preparing a mixed material by weighing and mixing calcium hydroxide ($Ca(OH)_2$) powder and calcium dihydrogenphosphate monohydrate powder or the like so that a molar ratio (Ca/P) of calcium to phosphor is set to a range of 1.45–1.72; putting the mixed material into a vessel of a milling device, mixing and milling the mixed material under predetermined milling conditions to form a precursor, and conducting a heat treatment to the obtained precursor at a temperature of 600° C. or more thereby to synthesize fine calcium phosphate powders such as β-tricalcium phosphate, calcium hydroxyphosphate or the like.

In the above method, as the material of the calcium hydrogenphosphate, it is preferable to use at least one compound selected from the group consisting of calcium monohydrogenphosphate ($CaHPO_4$), calcium monohydrogenphosphate dihydrate ($CaHPO_4 \cdot 2H_2O$), calcium dihydrogenphosphate ($Ca(H_2PO_4)_2$) and calcium dihydrogenphosphate monohydrate ($Ca(H_2PO_4)_2 \cdot H_2O$).

The above calcium hydroxide ($Ca(OH)_2$) powder and calcium hydrogenphosphate powder are mixed so that a molar ratio (Ca/P) of calcium to phosphor is set to a range of 1.45–1.72 thereby to prepare the mixed material. In particular, when a mixed material controlled to have a molar ratio of 1.45–1.55 is mixed and milled so that the mechanochemical compositing reaction takes place thereby to form a precursor, then the precursor is subjected to a heat treatment at a temperature of 600° C. or more, β-tricalcium phosphate ($Ca_3(PO_4)_2$) (TCP) is efficiently formed in accordance with the following formulae of (1)–(4):

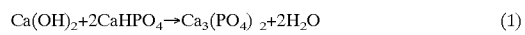  (1)

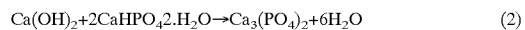  (2)

  (3)

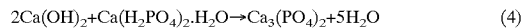  (4)

On the other hand, when a mixed material controlled to have a molar ratio of 1.62–1.72 is mixed and milled so that the mechanochemical compositing reaction is take place thereby to form a precursor, then the precursor is subjected to a heat treatment at a temperature of 600° C. or more, calcium hydroxyphosphate ($Ca_{10}(PO_4)_6(OH)_2$: hydroxyapatite (HAp)) is efficiently formed in accordance with the following formulae (5)–(8):

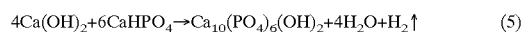  (5)

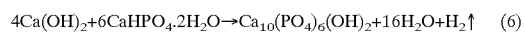  (6)

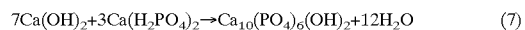  (7)

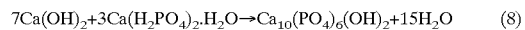  (8)

In addition, it is considered that when a predetermined amount of calcium oxide (CaO) is mixed to the above mixed material, it becomes possible to form tetracalcium phosphate (Ca$_4$(PO$_4$)$_2$.O:TTCP) in accordance with the following formulae (9) and (10):

$$Ca(OH)_2 + 2CaHPO_4 + CaO \rightarrow Ca_4(PO_4)_2.O + 2H_2O \quad (9)$$

$$2Ca(OH)_2 + Ca(H_2PO_4)_2.H2O + CaO \rightarrow Ca_4(PO_4)_2.O + 5H_2O \quad (10)$$

In addition, it is considered that when a predetermined amount of calcium fluoride (CaF$_2$) is mixed to the above mixed material, it becomes possible to form fluorine apatite (Ca$_{10}$(PO$_4$)$_6$F$_2$) in accordance with the following formulae (11) and (12):

$$3Ca(OH)_2 + 6CaHPO_4 + CaF_2 \rightarrow Ca_{10}(PO_4)_6F_2 + 3H_2O \quad (11)$$

$$6Ca(OH)_2 + 3Ca(H_2PO_4)_2.H_2O + CaF_2 \rightarrow Ca_{10}(PO_4)_6F_2 + 12H_2O \quad (12)$$

In the manufacturing method of this invention, when the soft-mechanochemical reaction is advanced in the process of mixing and milling the mixed material, the above various calcium phosphate precursors are formed. The above mechanochemical compositing reaction can be advanced as a solid phase reaction in a dry-process in which a material powder is mixed and milled without adding a dispersing medium to the material powder. On the other hand, the compositing reaction can be also advanced as a liquid phase reaction in a wet-process in which a slurry prepared by dispersing the mixed material powder in a solvent is mixed and milled.

As the milling device for promoting the soft-mechanochemical compositing reaction by mixing and pulverizing the above mixed material, a motor-driven mortar, a vibration mill and a planetary ball mill or the like are considered to be adopted. However, in these milling devices, a centrifugal effect is relatively small, and mechanical stress and impacting forces to be imparted to the material are insufficient. Therefore, even if the milling operation is carried out for about one hour or so, it is very difficult to impart sufficient reaction activity to the mixed material and also difficult to advance the soft-mechanochemical reaction. For this reason, in general, the reaction activity cannot be imparted to the mixed material powder until the material slurry is subjected to the treatment for a long time of about 10–50 hours or more. Accordingly, the above milling devices are not considered to be effective for simplifying the manufacturing processes.

Therefore, in the manufacturing method of the present invention, it is preferable to adopt various impacting-type grinding mills or a powder surface modifying device capable of repeatedly imparting an impacting force to the mixed material in a short time.

In the mixing and milling treatment for advancing the above soft-mechanochemical compositing reaction, the centrifugal effect (Z) to be imparted to the mixed material powder is required to be at least 15. In this connection, the centrifugal effect (Z) is a quantitative index showing a magnitude of pulverizing force, and is a ratio of the centrifugal force (Fc) to a gravitational force (Fg). The centrifugal effect (Z) is expressed by the following formula:

$$Z = Fc/Fg = r\omega^2/g(-)$$

wherein r is radius of rotation, ω is angular speed, and g is gravitational acceleration.

When the centrifugal effect (Z) is less than 15, the impacting force to be imparted to the mixed material is insufficient, and it becomes impossible to increase the reaction activity by forming distortions in crystal structure of the surface portion of the material particles in a short time. Therefore, in order to increase the reaction activity of the mixed material and to prepare the mixed material having a uniformity, it is required to use a milling device capable of imparting impacting force having a centrifugal effect (Z) of 15 or more, preferably 70 or more, and more preferably 150 or more.

In this connection, the method of the present invention therefore uses such an ultrafine mill (multi-ring type pulverizing mill) as shown in FIGS. 1 and 2 as the milling device comprising a number of ring-shaped pulverizing media for rapidly carrying out the soft-mechanochemical compositing treatment. This ultrafine mill is capable of applying impact force and friction to powder particles so as to enhance the reaction activity thereof, and efficiently mixing and milling the powder particles within a short time. The device comprises a cylindrical casing 1, a main shaft 4 which is rotated in the casing 1, and a plurality of sub-shafts 6 which are rotated around the main shaft 4 in linkage with the rotation of the main shaft 4, wherein each of the sub-shafts 6 being provided with many ring members 9 as grinding media. Although the size of each of the ring members 9 as the grinding media depends upon the type and size of the treatment device used, an outer diameter of the member is 25 to 45 mm, and the thickness of the member is several mm. Although the material for constituting the ring members 9 depends upon the physical properties of a material to be processed, the ring members 9 can be composed of stainless steel, ceramic materials such as alumina, zircoma or the like, or a hard carbide material such as WC.

The above casing 1 has an internal peripheral surface 2 having a center axis in a longitudinal direction, and comprises a rotational mechanism 3 provided in the casing 1 serving as a processing chamber. The rotational mechanism 3 comprises the main shaft 4 concentric with the casing 1, a pair of press plates 5 and 5' which are fixed at a predetermined interval therebetween in the longitudinal direction of the main shaft 4, and the sub-shafts 6 which are fixed by the press plates 5 and 5' so as to be arranged at the same distance from the main shaft 4 in parallel therewith.

Each of the press plates 5 and 5' has a form in which the same number of arms as the number of the sub-shafts 6 are radially projected. The form of the press plates 5 and 5' in which the arms are provided at equal intervals, not a simple disk form, can improve the degree of convection (mixing) of a material to be processed, which is put into the casing 1, and decrease as much as possible the amount of the material to be processed, which is deposited as a dead stock on the upper press plate 5.

Each of the sub-shafts 6 comprises a long bolt-like member having ends that are respectively passed through holes provided at the ends of the arms of both press plates 5 and 5' and tightened by nuts 7. The upper end of the main shaft 4 is connected directly to a driving Source such as a motor (not shown) or provided with a pulley so that the rotational force of the driving source is transmitted to the main shaft 4 through a V belt.

As shown in FIG. 2, for the purpose of increasing wear resistance, there may be a case where a cylindrical collar 8 is fitted on each of the sub-shafts 6 with a small gap therebetween, and a plurality of ring members 9 are retractably mounted on each of the collar 8. Each of the ring members 9 has an internal diameter sufficiently larger than the outer diameter of the collar 8, and is constructed so as to have a sufficient gap between the internal peripheral surface of the ring member 9 and the external peripheral surface of the collar 8 when the external peripheral surface of the ring member 9 contacts the internal peripheral surface 2 of the casing 1.

The ring members 9 are stacked to form a gap corresponding to the total thickness of 2 to 3 ring members 9 between the upper side of the uppermost ring member 9 and the lower side of the press plate 5, but not closely stacked between both press plates 5 and 5' without a gap. This stacking structure makes the ring members 9 rotatively around each of the collars 8.

Each of the ring members 9 is formed in a cylindrical form having parallel upper and lower surfaces, which is a so-called washer-like form having smooth upper and lower surfaces, and an outer peripheral surface. If required, the outer peripheral surface may be curved for promoting bite into the powder material.

Agitating blades 10 and 10' are radially disposed at upper and lower portions of the main shaft 4, which are below the lower press plate 5' and above the upper press plate 5, respectively, so as to agitate the material to be processed, which is put into the casing 1.

To an upper flange 13 of the casing 1 is fixed an upper cover 11 having a through hole by tightening members such as bolts and nuts, with a packing 12 therebetween. The main shaft 4 is passed through the through hole of the upper cover 11, the through hole being provided with an oil seal 14 for sealing the main shaft 4, and an oil seal holder 15 for holding the oil seal 14. In order to prevent a temperature rise of the material to be processed during grinding, the side of the casing 1 has a jacket structure 16. A refrigerant supply port 17 and discharge port 18 are provided in the jacket 16 so that the material to be processed which is put into the casing 1 can be cooled by continuously supplying any one of various refrigerants into the jacket 16.

In the grinding/milling device (ultrafine mill) constructed as described above, a gap of several millimeters (mm) is formed between the outer periphery of each of the sub-shafts 6 and the inner peripheries of the ring members 9 so that the ring members 9 can be freely independently rotated. The ring members 9 serving as the grinding media are radially moved by an amount corresponding to the gap due to the centrifugal force generated by the rotation of the main shaft 4, and circumferentially rotated in the casing 1 while being pressed on the inner periphery 2 of the casing 1. At the same time, the ring members 9 themselves are rotated around the sub-shafts 6 due to the friction between the inner peripheral surface 2 and the ring members 9. Namely, the ring members 9 are moved in the casing 1 while being repeatedly rotated around the main shaft 4 and each of the sub-shafts 6.

When the raw material mixture powder in an amount corresponding to 10 to 80% of the effective volumes of the grinding portion is put into the casing 1 and then subjected to the soft-mechanochemical treatment by rotating the main shaft 4, the raw material mixture powder is held between the rotating ring members 9 and the internal peripheral surface 2 of the casing 1, and subjected to impact force (compressive force) corresponding to the centrifugal effect caused by the ring members 9 and the grinding/milling function due to the rotation of the ring members 9 themselves. As a result, the raw material mixture powder is ground and dispersed, and, at the same time, strains and distortions are produced in the crystal structure of the particle surfaces of the mixture powder, so that a soft-mechanochemical compositing reaction is rapidly advanced thereby to form a calcium phosphate precursor in which the reactivity of the surfaces of the raw material mixture powder is enhanced. The centrifugal effect Z exerted on the raw material mixture powder is controlled by changing the rotational speed of the main shaft 4.

According to knowledge of the inventors of this invention, it has been confirmed that the soft-mechanochemical compositing reaction to be advanced by mixing and pulverizing the mixed material is greatly influenced by operating conditions such as a kind or magnitude of the mechanical stress, pulverizing mechanism of the milling device, atmosphere for the treatment or the like.

In place of the conventional milling devices such as motor-driven mortar, various ball mills or the like, when there is particularly used a milling device like the above multi-ring media type ultrafine mill having a special pulverizing mechanism provided with a number of ring-shaped pulverizing media, the reactivity of the material mixture can be rapidly increased by the short-time mixing and pulverizing treatment, so that it becomes possible to shorten a required time for the soft-mechanochemical compositing reaction.

In the method of this invention when the mixing/milling operation is performed and acid-base points are formed on surface of the material particles, the soft-mechanochemical reaction is advanced by a reaction mechanism in which new chemical bondings are directly formed by the inter-action between the acid-base points formed on the surfaces of the different material particles, whereby the calcium phosphate precursor is formed. Although this reaction is one kind of a solid-phase reaction, it has a characteristic of exhibiting a high reaction rate, so that a time required for synthesizing calcium phosphate compound can be greatly shortened in comparison with that of the conventional method.

The reaction mechanism of the above soft-mechanochemical reaction mechanism to be used in the method of this invention is quite different from that of the conventional mechanochemical reaction mainly consisting of a liquid-phase reaction disclosed in Japanese Patent Publication No. 3 (1991)-69844 in which a dissolving of solid material is promoted by a wet-type pulverization then a compositing reaction is advanced by a mutual reaction of ions generated in a solution thereby to cause the liquid phase reaction.

That is, the method of this invention is a method wherein acidbase points are generated at the surface of the solid material particles by utilizing the mechanical stress and simultaneously cause the mutual reaction (inter-reaction). In this point, the reaction mechanism used in this invention is also quite different from that of the conventional solid-phase method i.e., a high temperature solid-phase reacting method in which the mutual reaction between the different material particles is advanced by using heat energy thereby to form calcium phosphate compound.

In particular, non-free water such as hydroxyl group and bound water (crystal water) is quite different from free water to be added to the material powder as dispersion medium in the conventional method. The non-free water has a strong function as a catalyser for promoting the mechanochemical compositing reaction to be caused during the mixing and milling the material mixture. Accordingly, when the calcium hydroxide powder having the non-free water i.e., hydroxyl group or calcium hydrogenphosphate having the bound water is used as a starting material like this invention, the mechanochemical reaction can be rapidly advanced in the mixing/milling process thereby to effectively produce calcium phosphate precursor.

The catalytic action by the above non-free waters such as hydroxyl group and the combined water or the like in the soft-mechanochemical reaction is similarly revealed in not only a case where the dry-type mixing/milling operation is performed without adding the non-free water as the dispersing medium but also a case where the wet-type mixing/milling operation is performed to a highly-concentrated material slurry which is prepared by adding the dispersion medium so as to have a solid content of 15–50 wt %, and more preferably to have a solid content of 20–40 wt %.

In particular, when the material mixture to which the dispersion medium such as water is not added is mixed and milled in a dry-process unlike the conventional method, a drying-process is not required to perform to the resulting precursor substance at a stage after the completion of the soft-mechanochemical compositing reaction, so that the precursor substance can be immediately supplied to a heating-treatment process. Therefore, a crystallization of the precursor can be advanced by the heat treatment at a low temperature, so that calcium phosphate compounds such as β-tricalcium phosphate can be manufactured at high efficiency and low cost.

When the precursor substance obtained by the above soft-mechanochemical compositing reaction is subjected to the heat treatment, calcium phosphate compounds such as β-tricalcium phosphate and hydroxy calcium phosphate can be manufactured. The above heat treatment is performed at temperature of 600–800° C. for 1–3 hours or at temperature of 900–950° C. for 1–10 minutes. Namely, in the heat treatment at 600+ C. or more, when the temperature is set to be low, the time required for the heat treatment is relatively lengthened. On the other hand, when the temperature for the heat treatment is set to be lower than 600° C., a part of un-reacted material is left, so that the purity in substantial structure and crystallizing property of the calcium phosphate compound is lowered. When the above temperature and time for the heating treatment are controlled, it becomes possible to adjust and control the purity in substantial structure and crystallinity of β-tricalcium phosphate and hydroxy calcium phosphate.

In the manufacturing method of this invention, for example, calcium hydroxide and calcium dihydrogenphosphate monohydrate powders are used as starting materials so as to prepare a mixed powder of which molar ratio of Ca to P is appropriately controlled and the mixed powder is further mixed and milled in dry-process, so that soft-mechanochemical reaction is rapidly advanced thereby to form β-tricalcium phosphate precursor. Then, when the precursor is subjected to a heat treatment at temperature of 600° C. or more, there can be manufactured finely crystallized powder of β-tricalcium phosphate (TCP).

The above soft-mechanochemical reaction is caused even if the dispersing medium such as water or the like is not existing and the reaction is caused by an interaction between acid-base points existing on the surfaces of different material particles. At this time, a mechanochemical dehydrating reaction and an amorphousizing reaction are advanced thereby to produce β-tricalcium phosphate precursor as an intermediate product.

The above mechanochemical dehydrating reaction is quite different from an ordinary heat-dehydrating reaction to be caused by heat energy and the mechanochemical dehydrating reaction is a reaction in which a bonding state of hydroxyl group is changed by the mechanical energy caused in the mixing/milling process. The change of the bonding state of the hydroxyl group takes an important role in forming β-tricalcium phosphate (TCP) precursor by the above soft-mechanochemical compositing reaction. A completion state (degree of advancement) of the above various reactions, composition (purity) and molecular structure of the product or the like are totally evaluated by various analyzing and testing methods such as thermogravimetry-differential thermal analysis (TG-DTA), X-ray diffraction method (XRD) and Fouier transform infrared microscope (FT-IR) or the like.

In the mixing/milling process in the method of this invention, a chemical interaction is mainly taken place in addition to a mere physical mixing of different material particles. The material particle size is changed by the milling operation thereby to increase surface energy per unit volume of the material particles and to increase lattice inconsistencies such as dislocation of crystals and amorphousizing to be caused in a solid body of the material particles. Such increases of the surface energy and the lattice inconsistency also become one factor for promoting the aforementioned soft-mechanochemical compositing reaction.

In a case where the material mixture is treated under the conditions of mixing/milling by dry-process in the method of this invention without adding a dispersion medium to the material mixture, a milled substance (precursor) to be obtained is dried powder, so that there is no need to adopt a drying process which had been deemed to be an essential process for the synthesizing method based on the conventional wet-type mechanochemical reaction method. Therefore, when the precursor formed by the reaction is directly subjected to the heat treatment, fine particle powder of β-tricalcium phosphate crystal can be obtained while an input amount of the heat energy is reduced. The production of β-tricalcium phosphate is due to the blended molar ratio of Ca to P, and hydroxy calcium phosphate can be also produced by changing the molar ratio through a similar process.

As mentioned above, the mixing/milling process in the method of this invention may be performed in accordance with the dry-type mixing method in which the dispersing medium such as water is not added to the material mixture. However, the same effect can be also obtained in accordance with a wet-type mixing method in which the dispersing medium is added to the material mixture to prepare a material slurry having a high solid content of 15–50 wt %, preferably 20–45 wt %, then the material slurry is mixed/milled. In a case where this wet-type mixing method is adopted, the solid content of the material slurry can be greatly increased in comparison with that of the conventional method, it becomes possible to efficiently manufacture calcium phosphate compounds in a short time. In particular, when the aforementioned multi-ring medium type ultrafine mill is used as the milling device for performing the mixing/milling operation, the effective milling operation can be performed with respect to the slurry having a high solid contents and high viscosity.

for one minute performed in Example 1 according to the present invention.

Figure 7:
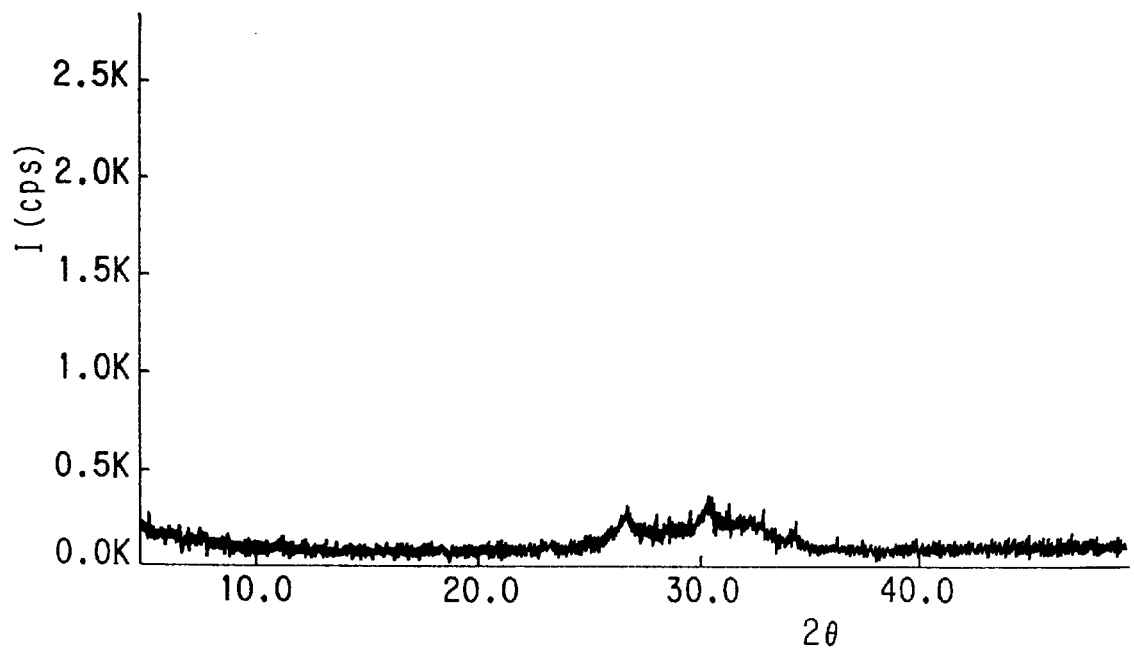

FIG. 7 is a graph showing an X-ray diffraction profile of a precursor obtained by the soft-mechanochemical reaction caused at mixing/milling operation in Example 4.

Figure 8:
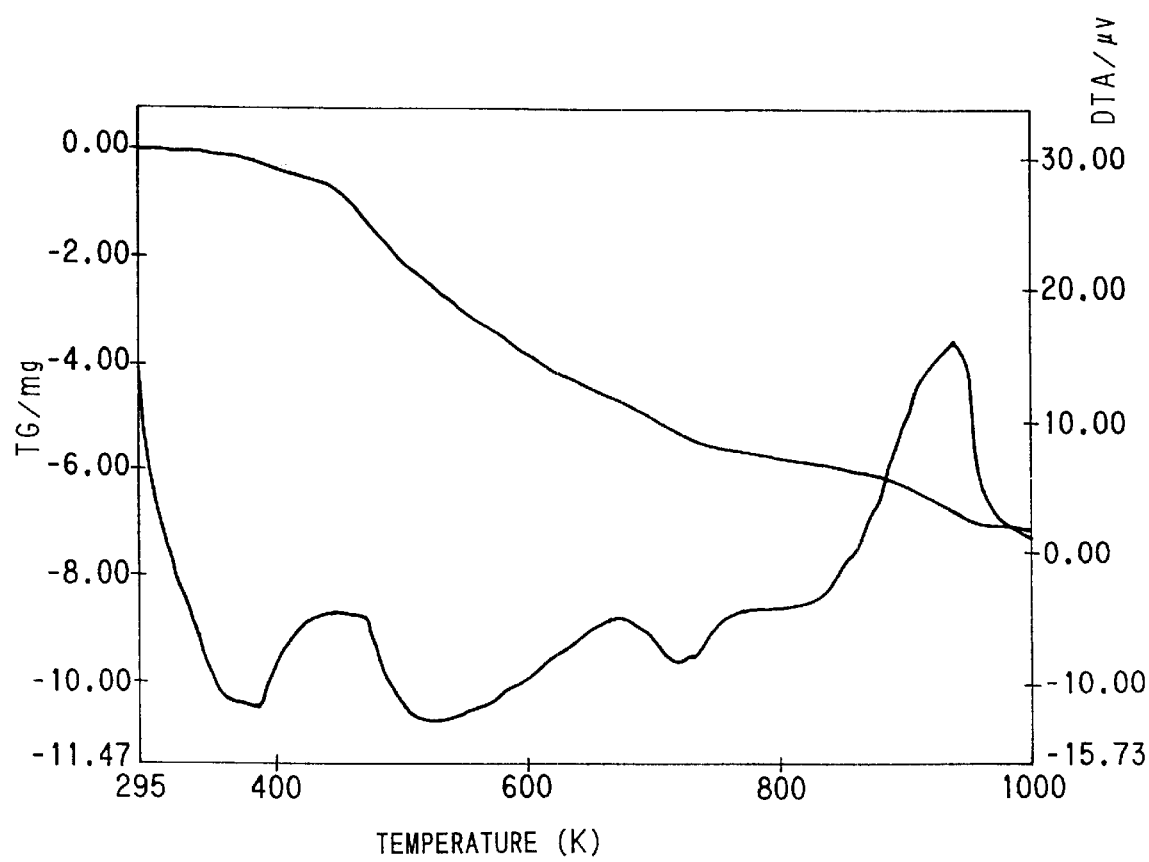

FIG. 8 is a graph showing TG-DTA profile of β-tricalcium phosphate precursor obtained by the soft-mechanochemical reaction caused in Example 4 according to the present invention.

Figure 9:
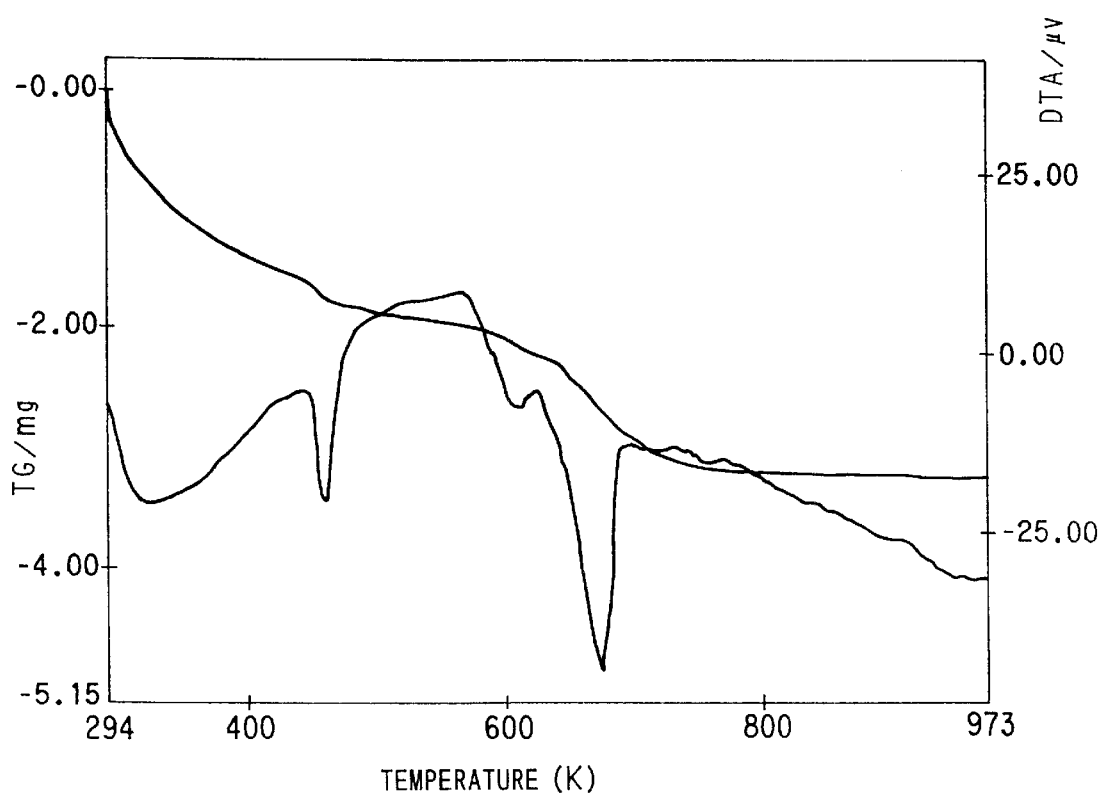

FIG. 9 is a graph showing a TG-DTA profile of the material mixture before the milling operation in Example 4.

Figure 10:
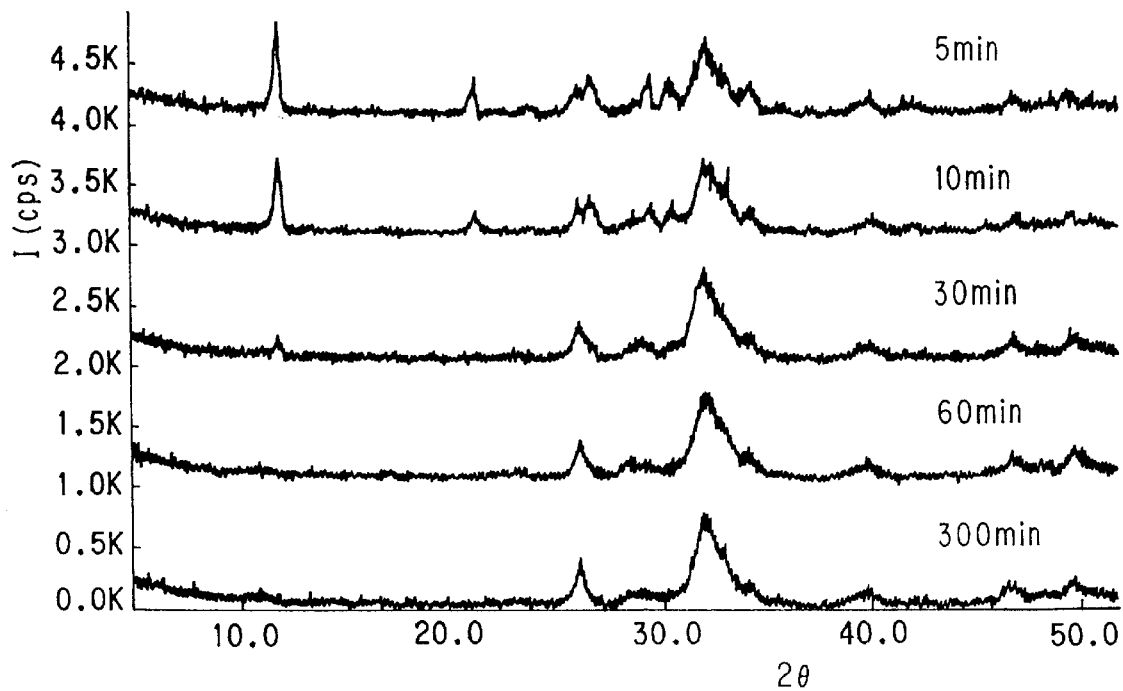

FIG. 10 is a graph showing a variation of X-ray diffraction profile of a precursor sample prepared at mixing/milling operation in Example 7.

Figure 11:
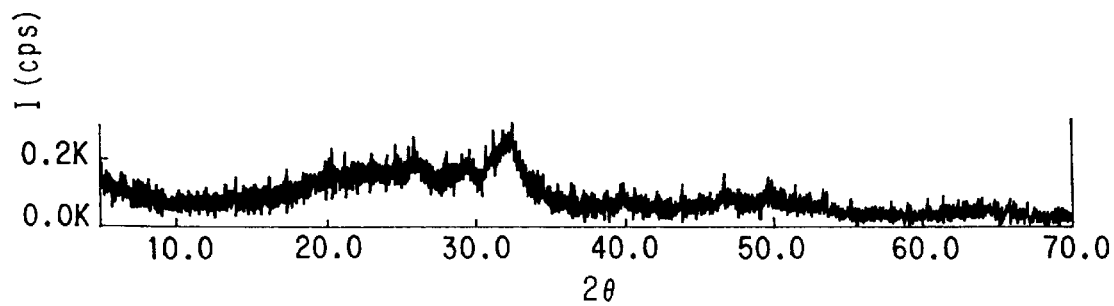

FIG. 11 is a graph showing an X-ray diffraction profile of a hydroxy calcium phosphate precursor prepared in Example 8.

Figure 12:
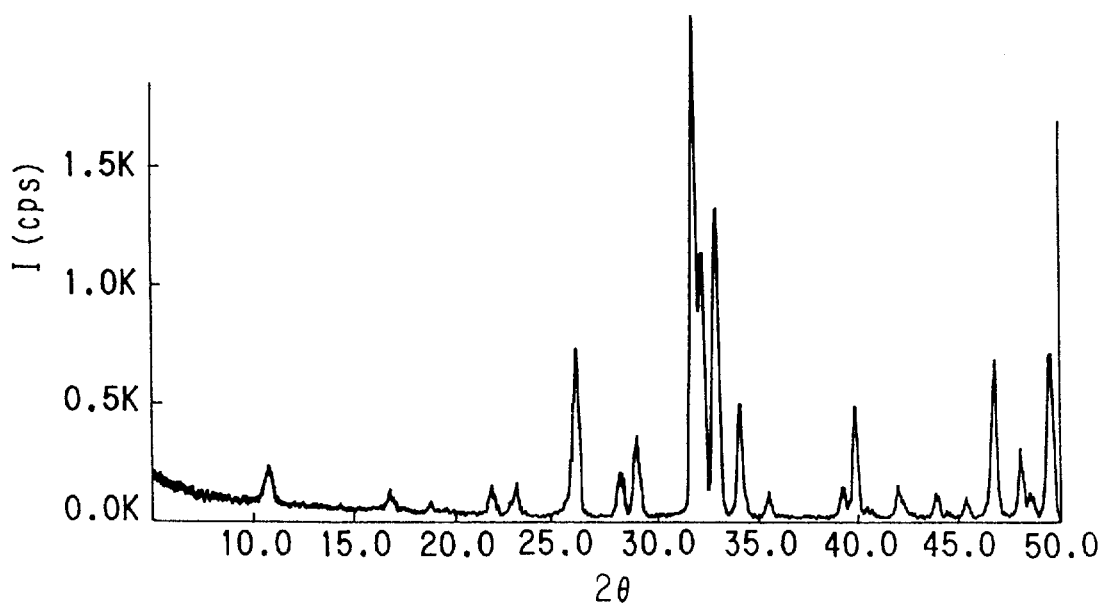

FIG. 12 is a graph showing an X-ray diffraction profile of a hydroxy calcium phosphate obtained by the heat treatment in Example 8.

Figure 13:
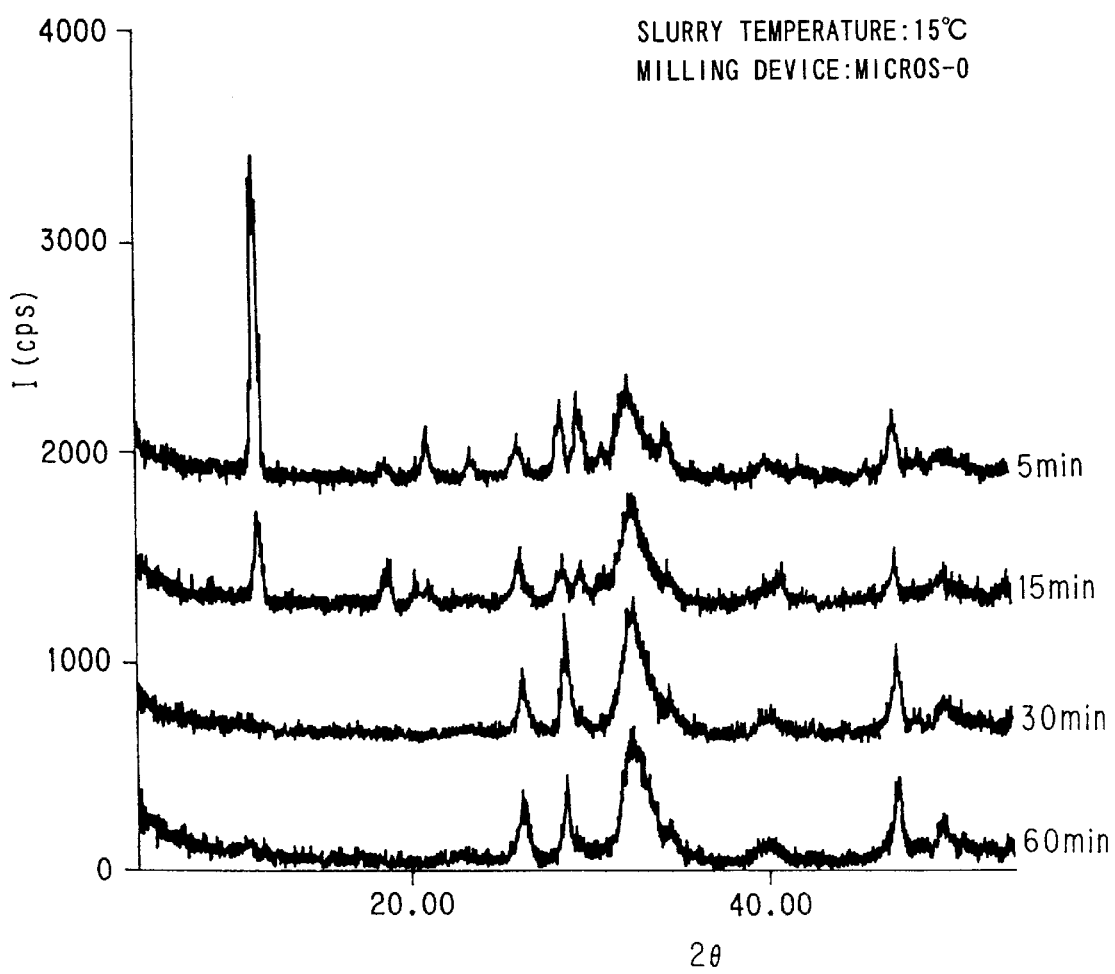

FIG. 13 is a graph showing a variation of X-ray diffraction profile of a sample prepared in Examples 9 as the time for the wet-type mixing/milling treatment had passed.

BEST MODE FOR EMBODYING THE INVENTION

Next, embodiments of the present invention will be explained on the basis of the following Examples and Comparative Examples.

EXAMPLE 1

Calcium hydroxide powder (mfd. by Kanto Kagaku K.K., reagent grade 1) and calcium dihydrogenphosphate mono-hydrate (mfd. by Showa Kagaku K.K., reagent grade 1) were weighed and blended so that a molar ratio (Ca/P) of calcium to phosphor was controlled to be 1.5, thereby to prepare a mixed material.

50 g of this mixed material was put into a casing 1 of a multi-ring media type ultrafine mill (MICROS-O type mill, mfd. by K.K. Nara Kikai Seisakusho, technical specification: zirconia ring) shown in FIGS. 1 and 2. Under a state where a cooling water having a temperature of 15° C. was circulated in a jacket 16 provided to an outer peripheral portion of the casing 1 thereby to keep the temperature of the casing 1 to be a constant value, a rotation speed of the main shaft 4 was set to 800 rpm and mixing/milling operation for the mixed material slurry was carried out for 60 minutes, so that the soft-mechanochemical compositing reaction was advanced thereby to prepare a precursor.

Figure 3:
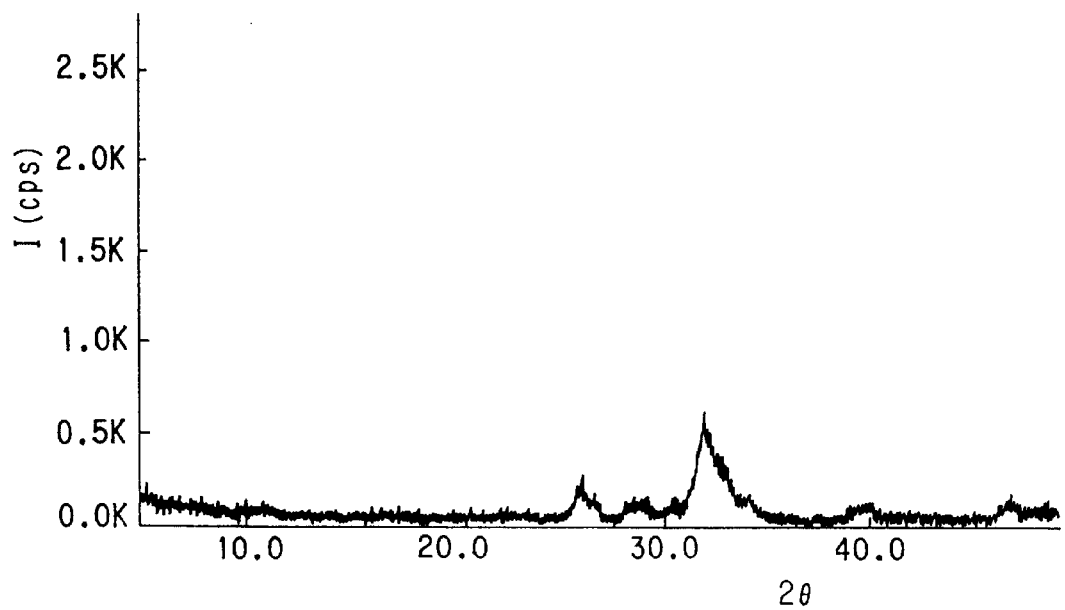
FIG. 3 is a graph showing an X ray diffraction (XRD) profile of a β-tricalcium phosphate precursor obtained by the soft-mechanochemical reaction caused at mixing/milling operation in Example 1 according to the present invention.
Figure 4:
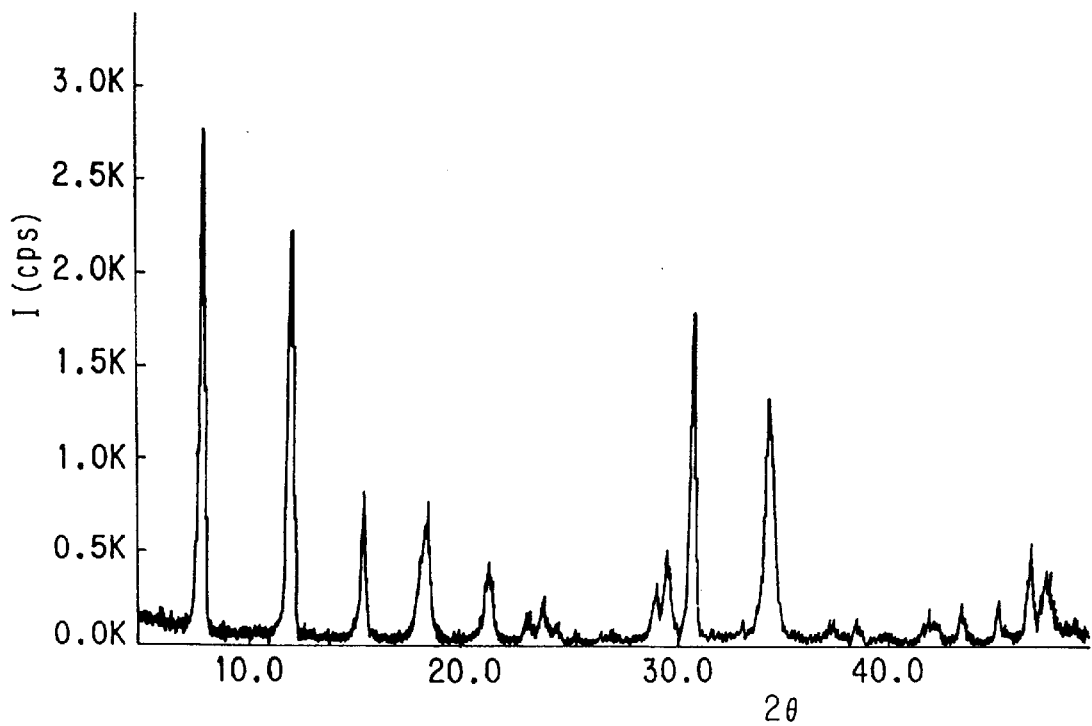
FIG. 4 is a graph showing an X-ray diffraction profile of the material mixture before the milling operation in Example 1.

An X-ray diffraction (XRD) profile of thus milled sample i.e., β-tricalcium phosphate precursor produced by the soft-mechanochemical compositing reaction caused at mixing/milling operation is shown in FIG. 3. On the other hand, in order to compare with the state shown in FIG.3, an X-ray diffraction profile of the sample before the milling operation is shown in FIG. 4. The material mixture before the milling operation was prepared in such a manner that calcium hydroxide powder and calcium dihydrogenphosphate mono-hydrate powder were weighed and blended so that a molar ratio (Ca/P) of Ca to P was controlled to be 1.5 thereby to prepare a mixture, then the mixture was sufficiently mixed and dispersed in acetone by means of a manual-mortar.

Figure 5:
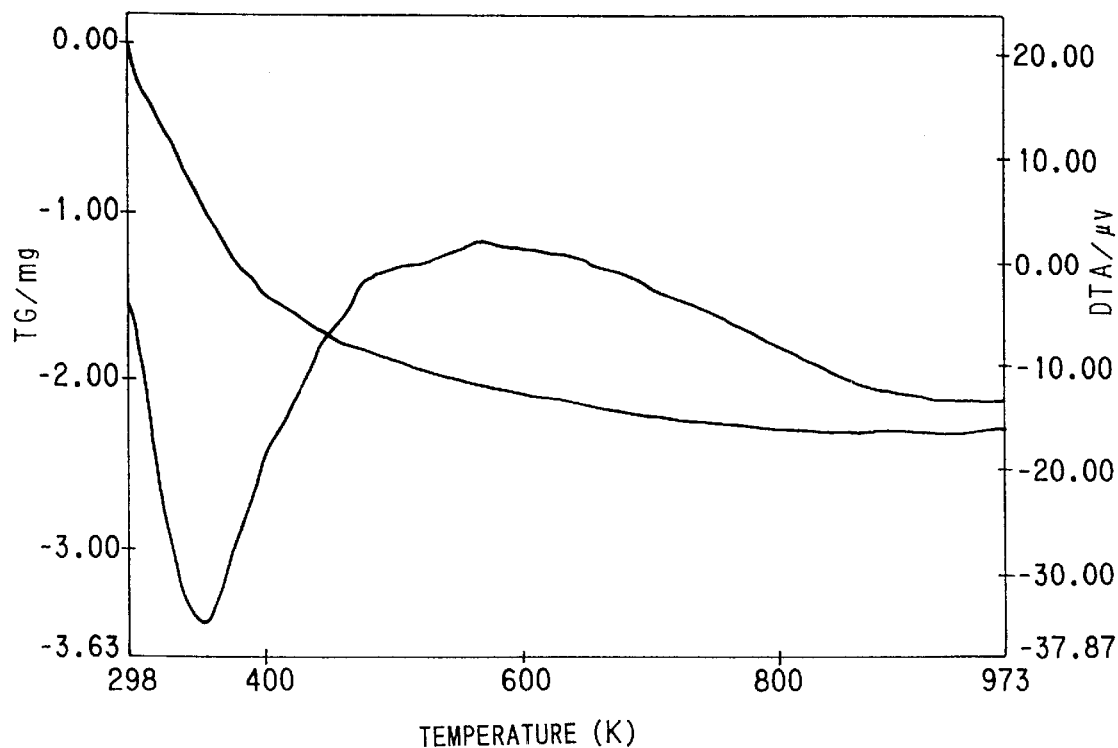
FIG. 5 is a graph showing results of thermogravimetry-differential thermal analysis (TG-DTA) of a β-tricalcium phosphate precursor obtained by the soft-mechanochemical reaction caused in Example 1.

The thermogravimetry-differential thermo analysis measurement profile (TG-DTA graph) is shown in FIG. 5.

As shown in FIGS. 3 and 5, both calcium hydroxide powder and calcium dihydrogenphosphate mono-hydrate powder as starting materials were not detected in the sample after the milling treatment, so that it was confirmed that the soft-mechanochemical compositing reaction was completely finished.

Further, 1 gram of the above milled sample was put into an electric furnace (hyper-speed, high-temperature muffle furnace, SF-17L type: mfd. by Shibata Kagaku Kiki Kogyo K.K.), then heated at a heating speed of 10° C./min. in air atmosphere and subjected to a heat treatment at 630° C. for two hours or at 930° C. for one minute. The heat-treated sample was analyzed by X-ray diffraction method and thus obtained X-ray diffraction profile is shown in FIG. 6.

Figure 6:
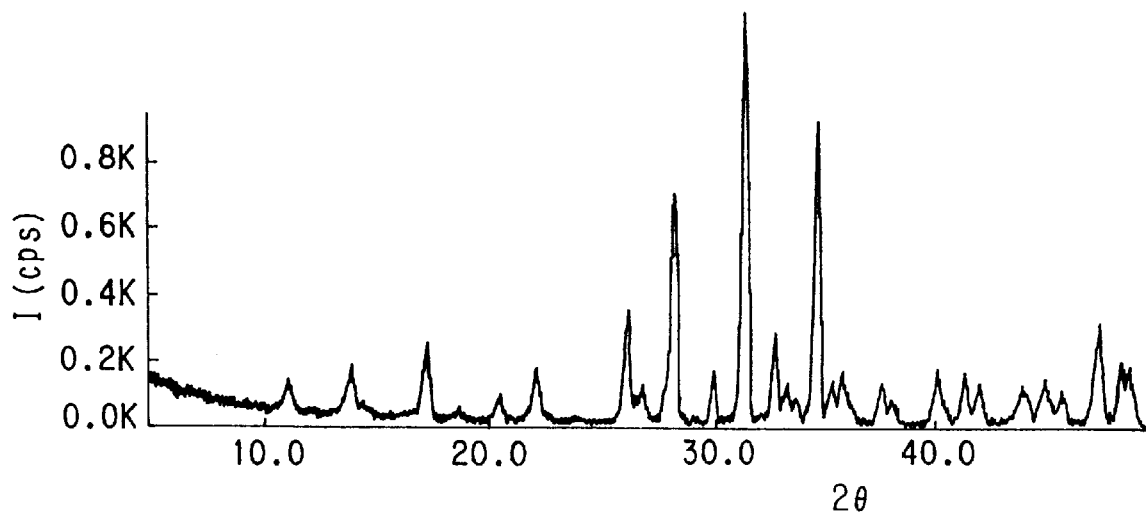
FIG. 6 is a graph showing an X-ray diffraction profile of a β-tricalcium phosphate (TCP) fine powder obtained by the heat treatment of the precursor at a temperature of 930° C.

As is clear form FIG. 6, it was confirmed that each of the substances produced by the heat treatment was confirmed to be β-tricalcium phosphate crystal having a high degree of crystallization and a structural uniformity. In this connection, when the temperature of the heat treatment is set to be less than 600° C., the reaction was incompletely advanced, so that it was found to be difficult to control the product qualities such as purity or the like.

Thus produced β-tricalcium phosphate powder was subjected to SEM analysis and grain size distribution analysis. As a result, β-tricalcium phosphate powder was found to be an aggregated body consisted of ultrafine particles each having an average grain size of about 1 μm. Further, when thus obtained β-tricalcium phosphate powder was subjected to a heat treatment at a high temperature, for example at 1200° C. for about one hour, it was confirmed that a β-tricalcium phosphate powder having a high degree of crystallization and structural uniformity could be also obtained.

Note, in all of Examples of the present invention and Comparative Examples, X-ray diffraction analysis was conducted by using an MXP device (mfd. by Mac. Science K.K., scan speed: 5 deg/min, voltage: 40 kv, current: 40 mA). Further, thermogravimetry-differential thermo analysis (TG-DTA) was conducted by using a thermal analyzing system (001, TG-DTA2000 mfd. by Mac.Science K.K., standard sample $Al_2O_3$, $N_2$ atmosphere). Furthermore, SEM analysis was conducted by using a scanning electron microscope (S-530 type, mfd. by K.K. Hitachi Seisakusho). In addition, the grain size distribution analysis was conducted by using a laser diffraction type grain size distribution measuring device (SALD-2000A type, mfd. by K.K. Shimazu Seisakusho, water dispersant, ultrasonic dispersion, refractive index: 1.60–0.01i).

EXAMPLE 2

Calcium hydroxide powder (mfd. by Kanto Kagaku K.K., reagent grade 1) and calcium dihydrogenphosphate mono-hydrate (mfd. by Showa Kagaku K.K.) were weighed and blended so that a molar ratio (Ca/P) of Ca to P was controlled to be 1.55, thereby to prepare a mixed material.

50 g of this mixed material was mixed/milled under the same conditions as in Example 1, so that the soft-mechanochemical compositing reaction was advanced thereby to prepare a precursor. Thus obtained precursor was then subjected to the heat treatment under the same conditions as in Example 1, thereby to form calcium phosphate compound. Thus obtained calcium phosphate compound was analyzed by X-ray diffraction analyzing method. As a result, the compound was found to be β-tricalcium phosphate crystal having a high degree of crystallization and structural uniformity.

EXAMPLE 3

Calcium hydroxide powder (mfd. by Kanto Kagaku K.K., reagent grade 1) and calcium dihydrogenphosphate monohydrate (mfd. by Showa Kagaku K.K.) were weighed and blended so that a molar ratio (Ca/P) of Ca to P was controlled to be 1.45, thereby to prepare a mixed material.

50 g of this mixed material was mixed/milled under the same conditions as in Example 1, so that the soft-mechanochemical compositing reaction was advanced thereby to prepare a precursor. Thus obtained precursor was then subjected to the heat treatment under the same conditions as in Example 1, thereby to form calcium phosphate compound. Thus obtained calcium phosphate compound was analyzed by X-ray diffraction analyzing method. As a result, the compound was found to be β-tricalcium phosphate crystal having a high degree of crystallization and structural uniformity.

Purified water was added to each of the mixed/milled substances i.e., β-tricalcium phosphate precursors obtained in the above Examples 1–3 thereby to prepare slurries each having a solid content of 15 wt %, respectively. Each of the slurries was left as it was for one week under a normal temperature and pressure, thereafter, dried at a temperature of 50° C. Thus obtained dried powder was analyzed by X-ray diffraction method. As a result, each of the precursors exhibited no change from a state before the purified water was added, so that it was confirmed that each of the precursors had an excellent stability with respect to water.

Further, each of the precursors obtained in Examples 1–3 were left as they were for three months in a state where the precursors contacted to atmosphere under normal temperature and pressure thereafter the resultant powders were analyzed by X-ray diffraction method As a result, each of the precursors exhibited no change from a state before the precursors was left as it was, so that it was also confirmed that each of the precursors had an excellent stability with respect to atmosphere.

Further, when the mixing/milling process is terminated in a state before the soft-mechanochemical compositing reaction is completely finished in the above Examples 1–3, even if the milled sample is one in which a small amount of calcium hydroxide powder and calcium dihydrogenphosphate monohydrate powder as the starting materials is detected, β-tricalcium phosphate crystal particles having a high purity, high degree of crystallization and highly structural uniformity can be manufactured if the treating temperature in the subsequent heat treatment process is sufficiently increased or the treating time is prolonged. Even in such a case, when the molar ratio (Ca/P) of Ca to P is outside the range of 1.45–1.55, it becomes difficult to form β-tricalcium phosphate crystal particles having a high degree of crystallization and highly structural uniformity, thus being not preferable.

COMPARATIVE EXAMPLE 1

Calcium carbonate powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.5, thereby to prepare a mixed material.

Purified water was added to the mixed material so that a solid content was controlled to be 25 wt % thereby to prepare a material slurry. 200 g of this material slurry was put into a casing 1 of a multi-ring media type ultrafine mill (MIC-O type mill. mfd. by K.K. Nara Kikai Seisakusho, technical specification: zirconia ring) shown in FIGS. 1 and 2 Then, the material slurry was mixed/milled under the same mixing/milling conditions as in Example 1 except that the milling time was set to 8 hours, so that the mechanochemical reaction was advanced thereby to prepare a milled powder.

Thus obtained milled powder was analyzed by X-ray diffraction method and differential thermal analysis. As a result, it was confirmed that a large amount of non-reacted substance was remained in the milled powder. Therefore, in the manufacturing method of Comparative Example 1 based on the conventional mechanochemical reaction, although the milling operation was conducted for a long time of 8 hours, the advancing speed of the mechanochemical reaction was remarkably lowered in comparison with those of Examples 1–3.

COMPARATIVE EXAMPLE 2

Calcium carbonate powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.5, thereby to prepare a mixed material.

Purified water was added to the mixed material so that a solid content was controlled to be 10 wt % thereby to prepare a material slurry. 200 g of this material slurry was put into a casing 1 of a multi-ring media type ultrafine mill (MIC-O type mill. mfd. by K.K. Nara Kikai Seisakusho, technical specification: zirconia ring) shown in FIGS. 1 and 2. Then, the material slurry was mixed/milled under the same mixing/milling conditions as in Example 1 except that the milling time was set to 8 hours, so that the mechanochemical reaction was advanced thereby to prepare a milled powder.

Thus obtained milled powder was analyzed by X-ray diffraction method and differential thermal analysis. As a result, it was confirmed that a large amount of non-reacted substance was remained in the milled powder. Therefore, in the manufacturing method of Comparative Example 2 based on the conventional mechanochemical reaction, although the milling operation was conducted for a long time of 8 hours, the advancing speed of the mechanochemical reaction was remarkably lowered in comparison with those of Examples 1–3. Further, since the solid content of the material slurry was small, the manufacturing efficiency was found to be disadvantageously lowered.

EXAMPLE 4

Calcium hydroxide powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.5, thereby to prepare a mixed material.

20 g of this mixed material was put into a motor-driven mortar (ANM-1000 type, mfd. by Aichi Denki K.K.) and mixed/milled for 22 hours under the conditions that the material was opened to atmosphere at room and a rotation speed was set to 100 rpm, so that the soft-mechanochemical compositing reaction was advanced thereby to prepare a precursor.

An X-ray diffraction (XRD) profile of thus milled sample i.e., β-tricalcium phosphate precursor produced by the soft-mechanochemical compositing reaction caused at mixing/ milling operation is shown in FIG. 7. On the other hand, the thermogravimetry-differential thermo analysis measurement profile (TG-DTA graph) of the milled sample (precursor) is shown in FIG. 8. Further, in order to compare with the state shown in FIG. 8, a TG-DTA graph of the mixed material before the milling operation is shown in FIG. 9.

As shown in FIGS. 7 and 8, both calcium hydroxide powder and calcium dihydrogenphosphate mono-hydrate powder as starting materials were not detected in the sample after the milling treatment, so that it was confirmed that the soft-mechanochemical compositing reaction was completely finished.

Further, 1 gram of the above milled sample was put into an electric furnace (hyper-speed, high-temperature muffle furnace, SF-17L type: mfd. by Shibata Kagaku Kiki Kogyo K.K.), then heated at a heating speed of 10° C./min. in air atmosphere and subjected to a heat treatment at 600° C. for two hours or at 930° C. for one minute. The heat-treated sample was analyzed by X-ray diffraction method.

As a result, it was confirmed that each of the substances produced by the heat treatment was confirmed to be $\beta$-tricalcium phosphate crystal having a high degree of crystallization and a structural uniformity. In this connection, when the temperature of the heat treatment is set to be less than 600° C., the reaction was incompletely advanced, so that it was found to be difficult to control the product qualities such as purity or the like.

Using the same starting materials as in Example 4, the materials were blended so that the molar ratios (Ca/P) of calcium to phosphor were changed to 1.55 and 1.45 respectively, thereby to prepare material mixtures. Each of the material mixture was subjected to the milling treatment using the same mixing/milling device used in Example 4.

Thus obtained samples after the milling treatment were analyzed by X-ray diffraction method and differential thermal analysis. As a result, as the same manner as in Example 4, it was confirmed that both calcium hydroxide powder and calcium dihydrogenphosphate mono-hydrate powder as starting materials were not detected in the samples after the milling treatment, so that it was also confirmed that the soft-mechanochemical compositing reaction was completely finished.

The products obtained by the above soft-mechanochemical compositing reaction were subjected to the heat treatment under the same conditions as in Example 1. The heat-treated samples were analyzed by X-ray diffraction method.

As a result, it was confirmed that each of the substances produced by the heat treatment was confirmed to be $\beta$-tricalcium phosphate crystal having a high degree of crystallization and a structural uniformity.

Purified water was added to each of the mixed/milled substances i.e., $\beta$-tricalcium phosphate precursors obtained in the above Example 4 thereby to prepare slurries each having a solid content of 15 wt %, respectively. Each of the slurries was left as it was for one week under a normal temperature and pressure, thereafter, dried at a temperature of 50° C. Thus obtained dried powder was analyzed by X-ray diffraction method. As a result, each of the precursors exhibited no change from a state before the purified water was added, so that it was confirmed that each of the precursors had an excellent stability with respect to water.

Further, each of the precursors obtained in Examples 4 were left as they were for three months in a state where the precursors contacted to atmosphere under normal temperature and pressure, thereafter the resultant powders were analyzed by X-ray diffraction method. As a result, each of the precursors exhibited no change from a state before the precursors was left as it was, so that it was also confirmed that each of the precursors had an excellent stability with respect to atmosphere.

Further, when the mixing/milling process is terminated in a state before the soft-mechanochemical compositing reaction is completely finished in the above Examples 4, even if the milled sample is one in which a small amount of calcium hydroxide powder and calcium dihydrogenphosphate mono-hydrate powder as the starting materials is detected, $\beta$-tricalcium phosphate crystal particles having a high purity, high degree of crystallization and highly structural uniformity can be manufactured if the treating temperature in the subsequent heat treatment process is sufficiently increased or the treating time is prolonged.

COMPARATIVE EXAMPLE 3

In accordance with a synthesizing method using the conventional mechanochemical reaction, calcium carbonate powder (mfd. by Showa Kagaku K.K., reagent grade 1) and calcium dihydrogenphosphate mono-hydrate (mfd. by Showa Kagaku K.K., reagent grade 1) were weighed and blended so that a molar ratio (Ca/P) of calcium to phosphor was controlled to be 1.5, thereby to prepare a mixed material.

Purified water was added to the mixed material so that a solid content was controlled to be 10 wt % thereby to prepare a material slurry. 20 g of this material slurry was put into a motor-driven mortar (ANM200 type porcelain mortar mfd. by Nitto Kagaku K.K.). Then, the material slurry was mixed and milled in a wet-process for 22 hours under the conditions that the slurry was opened to atmosphere of normal temperature, so that the mechanochemical reaction was advanced thereby to prepare a milled powder. In this connection, to prevent the solid content in the slurry from increasing by evaporating water during the milling operation, the milling operation was conducted in such a manner that purified water was appropriately added to the slurry on the way of the milling operation so that the solid content of the slurry was maintained to a constant level.

Thus obtained milled powder was analyzed by X-ray diffraction method and differential thermal analysis. As a result it was confirmed that a large amount of non-reacted substance was remained in the milled powder. Therefore, in the manufacturing method of Comparative Example 3 based on the conventional mechanochemical reaction, although the milling operation was conducted for a long time of 22 hours, the advancing speed of the mechanochemical reaction was remarkably lowered in comparison with those of EXAMPLE 4.

EXAMPLE 5

1 gram of the above precursor sample obtained in Example 1 was put into an electric furnace, then heated at a heating speed of 10° C./min. and subjected to a heat treatment at 930° C. for 10 minutes. The heat-treated sample was analyzed by X-ray diffraction method. As a result, it was confirmed that there could be obtained $\beta$-tricalcium phosphate crystal having a higher degree of crystallization and a structural uniformity than those in Example 1.

As is clear from the comparison with the treating conditions in Example 1, it was confirmed that the longer retention time in the heat treatment will result in better crystallizing property for $\beta$-tricalcium phosphate.

EXAMPLE 6

1 gram of the above precursor sample obtained in Example 4 was put into an electric furnace, then heated at a heating speed of 10°C./min. and subjected to a heat treatment at 930° C. for 10 minutes. The heat-treated sample was analyzed by X-ray diffraction method. As a result, it was confirmed that there could be obtained β-tricalcium phosphate crystal having a higher degree of crystallization and a structural uniformity than those in Example 4.

As is clear from the comparison with the treating conditions in Example 4, it was confirmed that if the retention time in the heat treatment was prolonged, β-tricalcium phosphate having better crystallizing property could be obtained.

According to the method of manufacturing calcium phosphate powder of Examples 1–6, calcium hydroxide powder and calcium dihydrogenphosphate powder are mixed and milled, so that the soft-mechanochemical reaction is quickly advanced by catalytic actions of hydroxyl group and combined water, whereby β-tricalcium phosphate precursor can be formed in a short time in comparison with the conventional method. Further, fine crystal particles of β-tricalcium phosphate can be effectively manufactured through a heat treatment with a low treating temperature and a short time in comparison with the conventional method.

According to each of the above manufacturing methods of Examples, a strict control of pH value and temperature condition for the reaction solution, which had been required in the conventional method as essential control, is not required, so that an operation control of the manufacturing equipment becomes extremely easy. In particular, the mixing/milling operation is conducted in a dry-process, so that it becomes possible to omit the drying process which had been required in the conventional wet-type manufacturing method as an essential process based on mechanochemical reaction in the conventional wet-type milling method (see, Japanese Patent Publication HEI3-69844). Therefore, an energy efficiency (running cost) can be improved. In addition, it becomes possible to omit a grind process for grinding again aggregations of powder which is liable to occur in the drying process, so that the manufacturing process can be further simplified.

Further, according to each of the above manufacturing methods of Examples, even if the outstanding method is compared with the conventional dry-process i.e. synthesizing method utilizing high-temperature solid phase reaction, fine βtricalcium phosphate powder can be manufactured with a low cost in a short time through a simple manufacturing facility.

EXAMPLE 7

Calcium hydroxide powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.5, thereby to prepare a mixed material.

Purified water was added to the mixed material so that a solid content was controlled to be 40 wt % thereby to prepare a material slurry. 200 g of this material slurry was put into a casing 1 of a multi-ring media type ultrafine mill (MIC-O type mill mfd. by K.K. Nara Kikai Seisakusho, technical specification: zirconia ling) shown in FIGS. 1 and 2.

Under a state where a cooling water having a temperature of 15° C. was circulated in a jacket 16 provided to an outer peripheral portion of the casing 1 thereby to keep the temperature of the casing 1 to be a constant value, a rotation speed of the main shaft 4 was set to 1200 rpm and wet-type mixing/milling operation for the mixed material slurry was carried out for 300 minutes, so that the soft-mechanochemical compositing reaction was advanced thereby to prepare a precursor.

When the mixing/milling time had passed for 5 minutes, 10 minutes, 30 minutes, 60 minutes and 300 minutes from the starting time of the mixing/milling operation, slurry samples were sampled respectively, and dried at a temperature of 50° C. Thereafter, each of the dried samples were analyzed by X-ray diffraction method, and analyzed results are shown in FIG. 10. As is clear from the results shown in FIG. 10, both calcium hydroxide and calcium dihydrogenphosphate mono-hydrate as starting materials were not detected at a stage when the mixing/milling time was 60 minutes or more, so that it could be confirmed that the soft-mechanochemical reaction was completely finished.

One gram of the dried slurry-sample of which mixing/milling time was 60 minutes or more was subjected to a heat treatment in which the sample was heated at a heating speed of 10° C./min. by means of an electric furnace and maintained at 700° C. for one hour thereby to form calcium phosphate compound powder. Thus obtained powder sample analyzed by X-ray diffraction method. As a result, the sample was found to be β-tricalcium phosphate crystalline particles having a high degree of crystallizing and a structural uniformity.

When the manufacturing method of the above Example 7 is compared with the manufacturing method utilizing a mechanochemical reaction to be caused in the conventional wet-type milling method, for example, the manufacturing method disclosed in Japanese Patent Publication HEI3-69844, there is a remarkable difference as described hereunder. Namely, in the conventional manufacturing method, a maximum value of the solid content of the material slurry is at most 15 wt %. In this case, the mixing/milling operation is required to be continued for a long time of about 5–50 hours, so that the manufacturing cost of the product is disadvantageously increased.

On the other hand, in the manufacturing method of Example of this invention, the solid content of the material slurry can be greatly increased up to 40 wt %, and the synthesizing reaction can be rapidly completed even if the mixing/milling time is set to a short time of about 60 minutes, so that it becomes possible to greatly increase a synthesizing amount of β-tricalcium phosphate per unit energy to be put into the reaction system.

That is, according to the manufacturing method of Example of this invention, β-tricalcium phosphate precursor can be formed in a shorter time than that of the conventional wet-type synthesizing method, so that β-tricalcium phosphate powder can be efficiently mass-produced. In particular, since the solid content of the material slurry can be set to a high level of 40 wt % in comparison with the conventional method, it becomes possible to remarkably shorten a drying time in the subsequent drying process. In particular, when a multi-ring media type ultrafine mill capable of milling the material slurry having a high viscosity is used as a milling device and the mixing/milling operation is continuously performed, a production efficiency of β-tricalcium phosphate powder can be abruptly increased.

EXAMPLE 8

Calcium hydroxide powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.67, thereby to prepare a mixed material. 50 g of this mixed material was mixed/milled under the same operating conditions as in Example 1 using the ultrafine mill (FIGS. 1 and 2), so that a soft-mechanochemical compositing reaction was advanced thereby to prepare hydroxy calcium phosphate precursor. FIG. 11 shows an X-ray diffraction profile (XRD profile) of thus prepared precursor.

Next, one gram of the above precursor sample was subjected to a heat treatment in which the sample was heated in air-atmosphere at a heating speed of 10° C./min. by means of the electric furnace used in Example 1 and maintained at 600° C. for one hour thereby to form a substance. FIG. 12 shows an X-ray diffraction profile of the heat-treated sample.

As is clear from FIG. 12, the substance obtained by the heat treatment was found to be hydroxy calcium phosphate crystals having a high degree of crystallizing and a structural uniformity.

Further, the materials used in above Example were blended so that the molar ratios (Ca/P) of calcium to phosphor were changed to 1.62 and 1.72 respectively, thereby to prepare material mixtures. Each of the material mixture was mixed and milled, thereafter subjected to the heat treatment under the same conditions as in the above Example. As a result, there could be obtained hydroxy calcium phosphate crystals having a high degree of crystallizing and a structural uniformity.

With respect to thus formed hydroxy calcium phosphate powder, SEM analysis and grain size analysis were conducted. As a result, each of the samples was found to consist of fine particles having an average size of about 500 nm.

EXAMPLE 9

Calcium hydroxide powder (mfd. by Kanto Kagaku K.K., reagent grade 1) and calcium dihydrogenphosphate monohydrate (mfd. by Showa Kagaku K.K., reagent grade 1) were weighed and blended so that a molar ratio (Ca/P) of calcium to phosphor was controlled to be 1.67, thereby to prepare a mixed material.

Purified water was added to the mixed material so that a solid content was controlled to be 40 wt % thereby to prepare a material slurry. 200 g of this material slurry was subjected to the wet-type mixing/milling operation using the same mixing/milling device used in Example 7 under the same operating conditions as in Example 7, so that the soft-mechanochemical compositing reaction was advanced thereby to prepare hydroxy calcium phosphate precursor.

When the mixing/milling time had passed for 5 minutes, 15 minutes, 30 minutes and 60 minutes respectively, slurry samples were sampled and dried at 50° C. FIG. 13 shows X-ray diffraction profiles of the dried samples.

FIG. 13 shows a fact that the precursors obtained by the mixing/milling operation for 30 minutes or more consist of a single phase of hydroxy calcium phosphate having a low crystallizing property.

One gram of the above dried sample obtained by the mixing/milling operation for 30 minutes was subjected to a heat treatment in which the sample was heated in air-atmosphere at a heating speed of 10° C./min. by means of the electric furnace used in above Example and maintained at 600° C. for one hour thereby to form a substance. Thus obtained substance was analyzed by x-ray diffraction method. As a result, the substance was found to be hydroxy calcium phosphate crystals having a high degree of crystallizing and a structural uniformity.

By the way, in the manufacturing method according to each of Examples, X-ray diffraction profiles (FIGS. 3, 7, 10, 11 and 13) and TG-DTA profiles (FIGS. 5 and 8) of the precursors to be formed after the mixing/milling operation are greatly different to each other in accordance with a kind of the milling devices such as multi-ring media type ultrafine mill and the motor-driven mortar or the like and the operating conditions thereof However, the profiles show that when each of the precursors was subjected to the heat treatment under suitable conditions, calcium phosphate powders such as β-tricalcium phosphate powder hydroxy calcium phosphate powder or the like having a high purity and fine grain size can be obtained.

Figure 1:
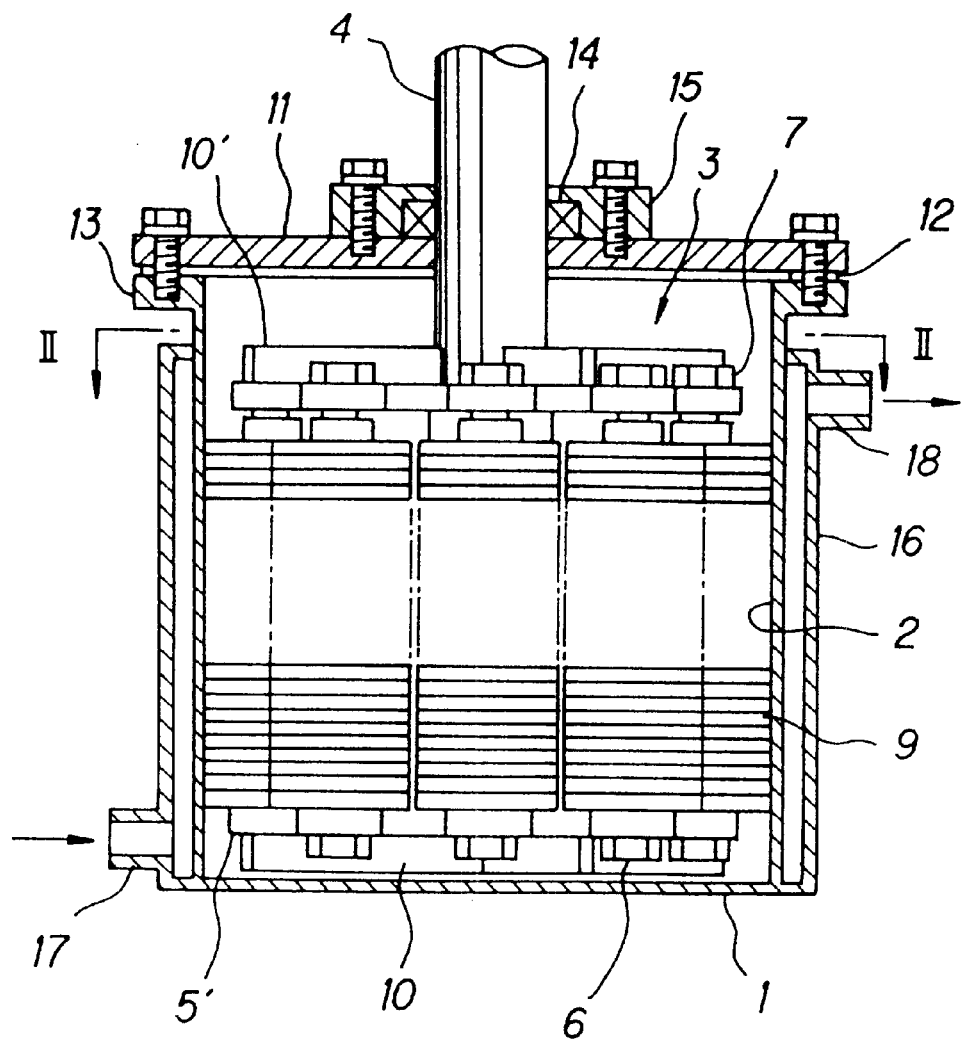
FIG. 1 is a cross sectional view showing a structure of a milling device used in the method of the present invention.
Figure 2:
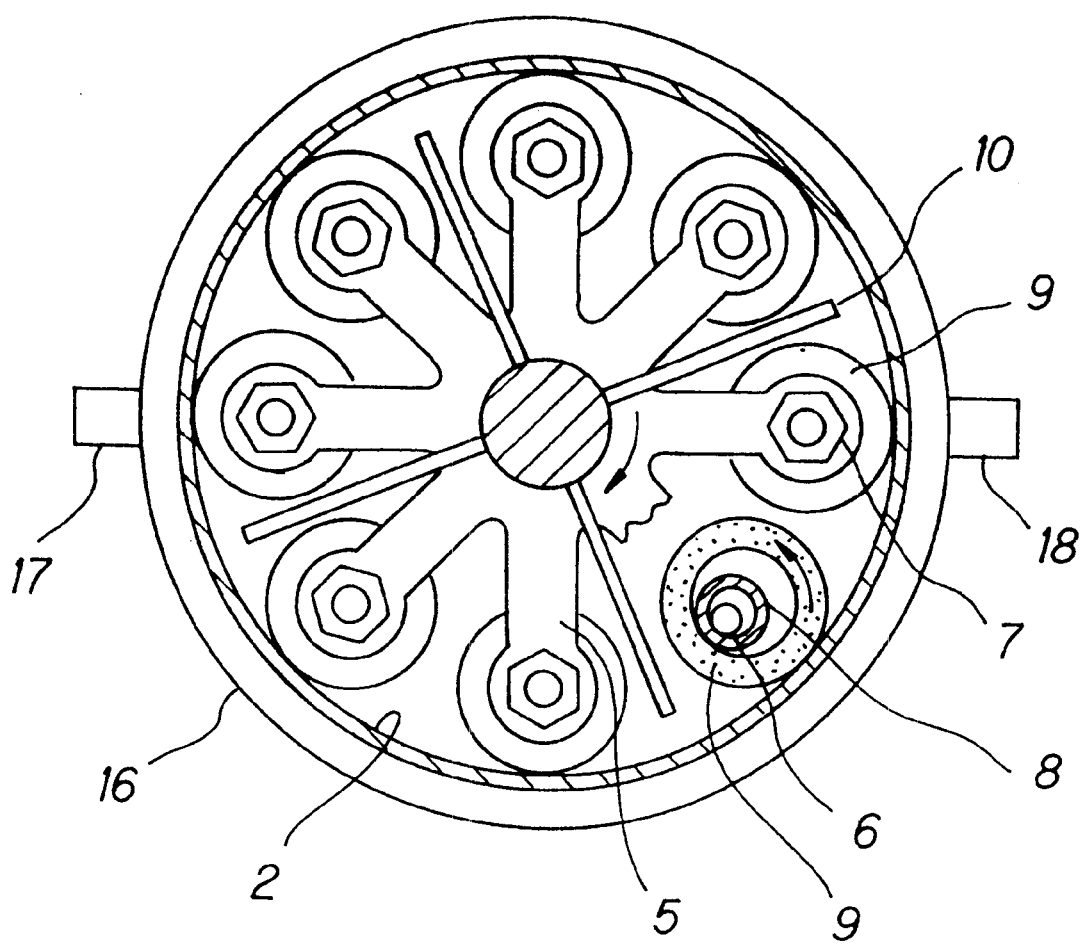
FIG. 2 is a cross sectional view taken along the line II—II of FIG. 1.

Accordingly, although any of milling devices such as ball mill, colloid mill, vibration mill or the like for general purpose other than the milling devices used in respective Examples can also used as the milling device (pulverizing device), in particular, when the multi-ring media type ultrafine mill shown in FIGS. 1 and 2 is used, the soft-mechanochemical compositing reaction can be rapidly advanced even if a material slurry having a high solid content and high viscosity is used.

In addition, when the heat-treating conditions such as such as treating temperature and treating time or the like for the calcium phosphate compound precursors formed in each Examples are properly adjusted, the crystallizing property of calcium phosphate fine particles such as β-tricalcium phosphate fine particles and hydroxy calcium phosphate fine particles or the like can be easily controlled.

INDUSTRIAL APPLICABILITY

As explained above, according to the method of manufacturing calcium phosphate powder of the present invention, calcium hydroxide powder having hydroxyl group or combined water exhibiting a large catalytic action is mixed with calcium hydrogenphosphate powder and the mixture is then milled, so that a soft-mechanochemical compositing reaction for forming calcium phosphate precursor is rapidly advanced whereby calcium phosphate compound powder can be efficiently manufactured.

In particular, when a multi-ring media type ultrafine mill comprising a number of ring-shaped milling media is used as a milling device for milling the mixed material, a reaction activity of the mixed material can be remarkably increased, so that it becomes possible to significantly shorten a time required for the soft-mechanochemical compositing reaction.

What is claimed is:

1. A method of manufacturing calcium phosphate powder comprising the steps of:

preparing a mixed material by mixing calcium hydroxide ($Ca(OH)_2$) powder and calcium hydrogenphosphate powder so that a molar ratio (Ca/P) of calcium to phosphorus is set to a range of 1.45–1.72;

conducting a mixing/milling treatment to said mixed material to cause a soft-mechanochemical compositing reaction thereby forming a calcium phosphate precursor, wherein said mixture/milling treatment is conducted by a dry-process; and conducting a heat treatment to said calcium phosphate precursor at a temperature of 600° C. or more thereby forming calcium phosphate powder.

2. A method of manufacturing calcium phosphate powder according to claim 1, wherein said calcium hydrogenphosphate is at least one compound selected from the group consisting of calcium monohydrogenphosphate ($CaHPO_4$), calcium monohydrogenphosphate dihydrate ($CaHPO_4 \cdot 2H_2O$), calcium dihydrogenphosphate ($Ca(H_2PO_4)_2$) and calcium dihydrogenphosphate monohydrate ($Ca(HPO_4)_2 \cdot H_2O$).

3. A method of manufacturing calcium phosphate powder according to claim 1, wherein said calcium phosphate is selected from the group consisting of β-tricalcium phosphate (TCP), calcium hydroxyphosphate (hydroxyapatite:HAp), and mixtures thereof.

4. A method of manufacturing calcium phosphate powder according to claim 1, wherein molar ratio (Ca/P) of calcium to phosphorus is set to a range of 1.45–1.55, said calcium phosphate precursor is tricalcium phosphate precursor, and said calcium phosphate is β-tricalcium phosphate (TCP).

5. A method of manufacturing calcium phosphate powder according to claim 1, wherein said molar ratio (Ca/P) of calcium to phosphorus is set to a range of 1.62–1.72, said calcium phosphate precursor is hydroxyapatite (HAp) precursor, and said calcium phosphate is calcium hydroxyphosphate.

6. A method of manufacturing calcium phosphate powder according to claim 1, wherein said mixing/milling treatment for said mixed material is performed by means of a multi-ring media type ultrafine mill comprising a plurality of ring-shaped pulverizing media.

7. A method of manufacturing calcium phosphate powder according to claim 1, wherein a centrifugal effect (Z) imparted to the mixed material powder in the mixing/milling treatment is at least 15.

* * * * *